UNITED STATES PATENT OFFICE.

WALTER KROPP, OF ELBERFELD, GERMANY, ASSIGNOR TO SYNTHETIC PATENTS CO., INC., OF NEW YORK, N. Y., A CORPORATION OF NEW YORK.

AMINOSUBSTITUTED ARYLPYRAZOLON.

1,151,885.

Specification of Letters Patent.

Patented Aug. 31, 1915.

No Drawing.

Application filed May 23, 1914. Serial No. 840,504.

*To all whom it may concern:*

Be it known that I, WALTER KROPP, doctor of philosophy, chemist, citizen of the German Empire, residing at Elberfeld, Germany, have invented new and useful Improvements in Aminosubstituted Arylpyrazolons, of which the following is a specification.

I have found that aminosubstituted arylpyrazolons can be condensed with the acidylized pyruvic acid compounds *e. g.*

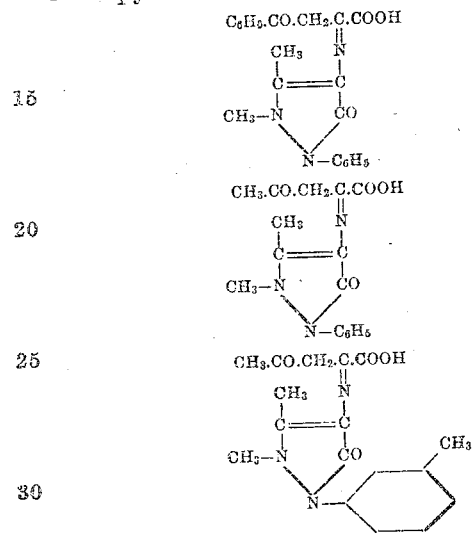

These products have proved to be valuable antipyretics and antineuralgics, an average single dose being from 1 to 2 grams. The new products are generally yellowish crystalline compounds soluble with difficulty in water and organic solvents, but easily soluble in alkalis. They form salts such as sodium, potassium, calcium and quinin salts, which retain the valuable therapeutic properties of the free compounds.

In order to illustrate the new process more fully the following example is given, the parts being by weight:—2000 parts of normal caustic soda lye are poured over 360 parts of the sodium salt of acetylpyruvic acid ester (acetone oxalic acid ester $CH_3-CO-CH_2-CO-COOC_2H_5$) and are allowed to stand until a test portion does no more give a yellowish oily precipitate when acidulated with acetic acid. 400 parts of 1-phenyl-2.3-dimethyl-4-amino-5-pyrazolon are then added to it and acidulated with hydrochloric acid. After five minutes the new compound crystallizes from this solution. It is difficultly soluble in cold water and in the usual organic solvents, such as ether, alcohol, acetone, ligroin, etc., but easily soluble in alkalis. It melts at 215–220° C., with decomposition.

The new acid has most probably the following formula

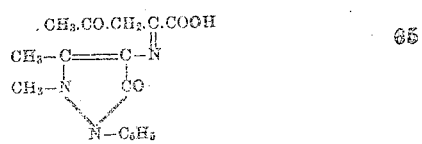

The sodium salt of this product can be obtained by adding an alcoholic solution of sodium ethylate to this acid and distilling off the alcohol. The calcium salt of this acid is produced by adding calcium carbonate to the aqueous suspension of the acid. When the carbonic acid is escaped it is filtered off and the filtrate is evaporated *in vacuo*. The neutral salt thus separated is washed with alcohol and ether.

In an analogous manner other of the above mentioned acids are obtained *e. g.* the condensation product of benzoylpyruvic acid and 1-phenyl-2.3-dimethyl-4-amino-5-pyrazolon, a crystalline substance melting at about 195° C., the quinin salt melting at 210° C., the condensation product of acetylpyruvic acid with 1-meta-tolyl-2.3-dimethyl-4-amino-5-pyrazolon melting at about 175° C., etc.

I claim:—

1. The new condensation products of arylaminopyrazolons and acidylpyruvic acid compounds which are generally yellowish crystalline compounds soluble with difficulty in water and organic solvents, easily soluble in alkalis, forming salts and being valuable antipyretics and antineuralgics, substantially as described.

2. The new condensation products of phenylaminopyrazolons and acidylpyruvic acid compounds which are generally yellowish crystalline compounds soluble with difficulty in water and organic solvents, easily soluble in alkalis, forming salts and being valuable antipyretics and antineuralgics, substantially as described.

3. The new condensation products of arylaminopyrazolons and acetylpyruvic acid compounds which are generally yellowish crystalline compounds soluble with difficulty in water and organic solvents, easily soluble in alkalis, forming salts and being valuable antipyretics and antineuralgics, substantially as described.

4. The new condensation products of phenylaminopyrazolons and acetylpyruvic acid compounds which are generally yellowish crystalline compounds soluble with difficulty in water and organic solvents, easily soluble in alkalis, forming salts and being valuable antipyretics and antineuralgics, substantially as described.

5. The new condensation products of 1-aryl-2.3-dimethyl-4-amino-5-pyrazolons and acidylpyruvic acid compounds which are generally yellowish crystalline compounds soluble with difficulty in water and organic solvents, easily soluble in alkalis, forming salts and being valuable antipyretics and antineuralgics, substantially as described.

6. The new condensation products of 1-aryl-2.3-dimethyl-4-amino-5-pyrazolons and acetylpyruvic acid compounds which are generally yellowish crystalline compounds soluble with difficulty in water and organic solvents, easily soluble in alkalis, forming salts and being valuable antipyretics and antineuralgics, substantially as described.

7. The new condensation products of 1-phenyl-2.3-dimethyl-4-amino-5-pyrazolons and acidylpyruvic acid compounds which are generally yellowish crystalline compounds soluble with difficulty in water and organic solvents, easily soluble in alkalis, forming salts and being valuable antipyretics and antineuralgics, substantially as described.

8. The new condensation product obtained from acetylpyruvic acid and 1-phenyl-2.3-dimethyl-4-amino-5-pyrazolon having most probably the following formula:

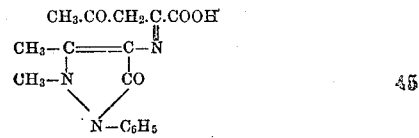

which melts at 215–220° C., being difficultly soluble in cold water and ether, alcohol, acetone, ligroin, easily soluble in alkalis; forming salts with sodium, calcium and other metals and being a valuable antipyretic and antineuralgic, substantially as described.

In testimony whereof I have hereunto set my hand in the presence of two subscribing witnesses.

WALTER KROPP. [L. S.]

Witnesses:
HELEN NUFER,
FRANCES NUFER.